United States Patent [19]

Nakazawa

[11] Patent Number: 5,288,983
[45] Date of Patent: Feb. 22, 1994

[54] SYMBOL READ DEVICE HAVING SEPARATE GAIN CONTROLS FOR READING DIFFERENT SCAN LINES

[75] Inventor: Atsushi Nakazawa, Osaka, Japan

[73] Assignee: Sumitomo Electric Industries, Ltd., Osaka, Japan

[21] Appl. No.: 930,045

[22] Filed: Aug. 17, 1992

Related U.S. Application Data

[62] Division of Ser. No. 710,182, Jun. 6, 1991.

[30] Foreign Application Priority Data

Jun. 6, 1990 [JP] Japan ................................ 2-147687
Jul. 2, 1990 [JP] Japan ................................ 2-175565
Nov. 15, 1990 [JP] Japan ................................ 2-310933

[51] Int. Cl.$^5$ .............................................. G06K 7/14
[52] U.S. Cl. ................................................. 235/462
[58] Field of Search ...................... 235/462, 467, 455; 250/214 AG

[56] References Cited

U.S. PATENT DOCUMENTS 4,792,666  12/1988  Cherry et al. ...................... 235/462

FOREIGN PATENT DOCUMENTS 176933  9/1985  European Pat. Off. .
180331  9/1985  European Pat. Off. .
194115  2/1986  European Pat. Off. .

*Primary Examiner*—John Shepperd
*Attorney, Agent, or Firm*—Cushman, Darby & Cushman

[57] ABSTRACT

A symbol read device which has separate gain controls for reading different scan lines. The symbol read device includes a light beam emitter, a scanner which scans the light beam over different positions on a symbol surface having a symbol to be read, a detector which detects light reflected from the symbol surface and generates a detection signal indicative thereof, and a variable gain amplifier which amplifies the detection signal. The device further includes a process which processes an amplified detection signal from the amplifier and recognizes therefrom the symbol being read, an automatic gain controller which sets a gain of the variable gain amplifier every scan line or scan line group in response to the detection signal, a scan position detector which detects a scan position, and a controller which selects the gain set by the automatic gain controller based on an output signal of the scan position detector.

4 Claims, 6 Drawing Sheets

SYMBOL READ DEVICE HAVING SEPARATE GAIN CONTROLS FOR READING DIFFERENT SCAN LINES

BACKGROUND OF THE INVENTION

This is a division of currently pending application Ser. No. 07/710,182, filed Jun. 6, 1991.

1. Field of the Invention

The present invention relates to a symbol read device for optically reading symbols, such as bar codes and characters, by scanning the symbols with a light beam. More particularly the invention is directed to a symbol read device which is capable of reading symbols, regardless of their orientations, by scanning the symbols in different directions.

2. Description of the Prior Art

With the widespread use of computers, there has been increasing demand for various types of automated input/output devices. One such device is an optical character reader (OCR) and another is a bar code reader (BCR). Such devices can read characters and codes recorded on cards, packages, and the like. It is required to accurately read characters and codes on character and code bearing surfaces by a read head relatively distant from the surface being read and not in contact with the character and the code bearing surfaces.

A known symbol read device includes a stand-alone type casing containing a laser beam generator for generating a laser beam, a scanning mirror for scanning the laser beam over a predetermined angular range (the scanning mirror could be a polygon mirror or a galvano mirror), a photodetecting element for receiving a light beam reflected from a symbol surface bearing a symbol thereon, and a signal processor for processing an output signal of the photodetecting element so as to recognize the symbol being read.

A known bar code reader employs a laser beam for scanning a surface bearing the bar code. The laser beam forms a small spot even at a distant position from the surface being read. Thus, it is capable of reading bar codes near to or far from the reader (large read depth). The bar code reader can automatically scan bar codes with the laser beam. An operator places an object bearing a bar code within a read field of a laser emitting window and the reader reads the bar code. When using a bar code reader in a pen-type casing, he places and slides a pen point of the device over the symbol surface bearing the code to be read.

In various applications, it is advantageous to use a so called hand-held type bar code reader. The various elements of such a reader are contained in a pistol-like casing for easy use. It can read the bar code by merely pointing the device at a target. It is handy and portable. Further, it can read from a surface of an object with which it is not even in direct contact. For example, a hand-held reader can be used to read a small bar code printed on a printed circuit board.

In a laser scan type symbol read device, laser light repeatedly scans a surface on which there is a symbol to be read. Laser light, having impinged on the symbol laden surface is reflected. The reflected light carries information as to the symbol on the surface. This light is converted into an electrical signal by some sort of photodetector. The output of the photodetector is amplified by an amplifier and signal processed by some kind of recognizing circuit. The recognizing circuit may, for example, convert the amplified signal into a two-value signal and recognize based on some threshold level.

The symbol surfaces may be located at various distances from the reading device, such as, for example, several cm to 1 m. Thus, the intensities of the reflected light received at the photodetector may vary significantly. If the gain of the amplifier is set to a level required for a close symbol surface, the device cannot read a symbol on a surface that is a great distance from the device. If the amplifier gain is set so as to read distant symbol surfaces, the device will not be able to read nearby symbols because the amplifier will be saturated.

For this reason, a symbol read device designed to have a wide read range employs an automatic gain control technique which automatically accommodates the magnitude output of the photodetecting element on the basis of the amount of tne reflected light from the previous scan. Levels of signals input to the recognizing circuit are limited to be within a preset range by selecting a small gain for a large quantity of reflected light from a close symbol surface, and a large gain for a small quantity of reflected light from a distant symbol surface. Thus, such a symbol read device can provide symbol recognition regardless of read distance.

Figure 10:
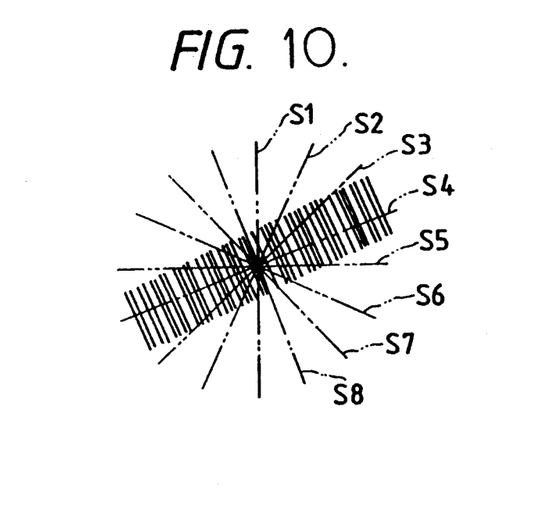
FIG. 10 is a view showing an omni scan process.
Figure 11:
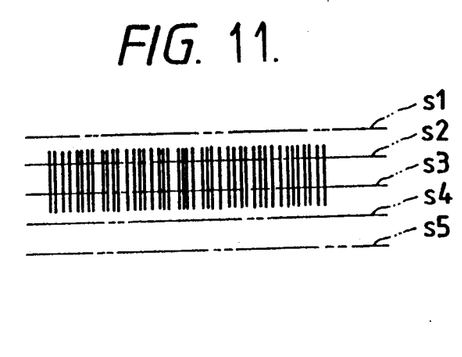
FIG. 11 is a view showing a raster scan process.

Recently, symbol read devices have been developed that employ an omni scan process or a raster scan process to make it easier for an operator to scan symbols. In the omni scan process, as shown in FIG. 10, a symbol is scanned by a plurality of scan lines at different angles. In the raster scan process, as shown in FIG. 11, symbols are scanned by a plurality of parallel scan lines s1 to s5.

The bar code read device of the omni scan type can read the symbol if any one of the scan lines scans across the entire bar code. Accordingly, there is no need to place the scanning device in a particular positional relationship with the bar code being read. The handling of the bar code read device when it reads symbols is remarkably improved.

A raster scan bar code device can read symbols if the scan lines are slightly oblique with respect to the bar code, because any of the scan lines will move across the entire bar code. In this respect, the device is easy to handle for reading a bar code. The device can even read a bar code with a cut-out if any of the scan lines traverses a perfect bar code portion of a defective bar code.

Bar code read devices including a laser beam are generally arranged so as to constantly emit a laser beam. The emitted laser beam may directly hit the operator's eyes. Such devices are usually designed to read a relatively distant bar code. However, when a bar code, which is not the one intended to be read, unexpectedly comes in a read range of the device, it will mistakenly be read. In this respect, it is desirable that the device emits the laser beam only when reading bar codes.

To cope with the problem, a conventional bar code read device includes a read start switch. The laser beam is emitted only when the switch is operated. Of course, the switch must be operated every time the bar code is read. This is very inconvenient particularly in such a situation as to read a number of bar codes, because the switch must be operated many times. Accordingly, repetitive operations impede efficiently entering data.

To solve the problem, there is a technique disclosed in Japanese Patent Application Unexamined Publication No. 64-25287. The publication discloses a laser oscillator for generating the laser beam that is intermittently operated even when a bar code is not being read.

The oscillator is continuously operated when an output signal of a photodetecting element is within a preset range of its value during the oscillation of the laser oscillator. When a quantity of the light reflected from the symbol surface is within a predetermined range of its values, the device judges that the symbol surface is present at a bar code read possible position, and automatically starts the operation of reading the bar codes. This technique is efficient.

However, there are problems associated with this technique. First, there is a danger that the laser beam may hit the eyes of the operator or persons present near the bar code read device, because the laser beam is intermittently emitted even when a bar code is not being read. Secondly, an additional controller is required. That is, to detect the symbol surface, the laser beam is directed toward the center of the scanning angular range and fixed thereat. The controller is additionally required to effect the control of the laser beam, which makes the construction of the device somewhat complicated.

The bar code reader of the multi-directional scan type is advantageous in that the positional relationship between the bar code and the bar code reader is not always accurately set. This can effect efficient reading of bar codes. Also, when this type of bar code reader reads a plurality of bar codes closely arrayed side by side, it may mistakenly read a bar code that is not intended to be read. A read error occurs when the laser beam obliquely scans a bar code, but fails to entirely scan the bar code. In the multi-directional scan type bar code reader, a read error will more frequently occur than in the unidirectional scan type bar code reader, because in the former, the positional relationship between the bar code and the bar code reader is roughly set. The problem is serious particularly when the data after read is not checked, and use of the unidirectional scan fOr reading bar codes sometimes ensures a reliable data read. Here, the check is a process of judging as to whether the bar code read is correct or not by detecting the first and last characters of a bar code when these characters are preset or the number of digits of a bar code when it consists of a predetermined number of digits.

As described above, multi-directional scan bar code readers are advantageous in some respects and are disadvantageous in others.

In omni scan and raster scan type bar code readers, the symbol surface is scanned in successive order, so that the scanned position on the surface is different every scan. The quantity of the light reflected from the symbol surface may be different from scan to scan. The change in reflected light may be remarkably large particularly when the photodetecting element receives the light from the symbol surface positioned directly opposite to the photodetecting element or when an object of high reflectivity, for example, metal is present on the scan path.

The automatic gain control technique which determines the gain of a variable gain amplifier on the basis of a previous scan, fails to deal with such a situation. When the amount of received light is extremely increased, the gain for the output of the photodetecting element in the present scan is controlled to be extremely small because of the extremely high quantity of the reflected light in the previous scan. Under this condition, if the symbol is correctly scanned, the read device cannot recognize the symbol since the gain for the output of the photodetecting element is considerably small. Thus, when using the bar code read devices of the omni scan type and the raster scan type, there is a case where use of the automatic gain control technique will degrade read performance. One way to avoid this is to narrow a range of read distance (read range), and to not use the automatic gain control technique. However, this makes it difficult to handle and operate the bar code read device.

SUMMARY OF THE INVENTION

Accordingly, the present invention provides a symbol read device intended to overcome the various technical problems described above. "Symbol read device" is intended to include bar code readers, optical character readers and other such devices. Various embodiments of a symbol read devices can be operated selectively in various reading modes to cope with a variety of reading situations.

In a multiple scan arrangement, the symbol read device has a beam emitter for emitting a light beam, a scanner for scanning different positions on a symbol surface bearing a symbol thereon with a light beam emitted from the beam emitter in successive order, detector for receiving light reflected from the symbol surface, a variable gain amplifier for amplifying an output signal of the detector, and a recognizing circuit for performing a signal processing for recognizing the symbol, using a signal from the variable gain amplifier. The gain of the variable gain amplifier for the output signal of the detector caused by each scan line or scan line group is set independent of the gains set for other scan lines or scan line groups. A gain for a scan line or a scan line group, for example, is set according to the output signal of the detector in the previous scan by the scanner to form the scan line or scan line group, so that it is not influenced by the output signal of the detector by other scan lines or scan line groups.

When the detector receives the regular reflection light from the symbol surface during a scan or when a scan line group moves across an object of a high reflectivity, such as metal, and light of high intensity is incident on the detector, if the gain for the scan line or the scan line group becomes extremely small, such an extremely small gain will not be set for another scan line or scan line group. Therefore, the symbol read device can accurately read symbols using the output signal of the detector for the latter scan line or scan line group. A selector selectively places the automatic gain controller in a state that of the gains set every scan line or scan line group, only a gain for the output signal of the detector caused by a specific scan line or scan line group is set to a value corresponding to the output signal of the detector, while gains for the remaining scan lines or scan line groups are set to a fixed value or in a state that gains set for all of the scan lines or the scan line groups to a value corresponding to the output signal of the detector.

If the fixed value is satsifactorily small, the symbol read device may preform the symbol recognizing processing using only the output signal. of the detector by the single scan line or scan line group, while prohibiting the symbol recognition processing using the output signal of the detector by the other scan lines or scan line groups. This feature is very useful for a case where many symbols are closely arrayed and an undesired symbol may be mistakenly read. In this case, the mistaken read can be avoided by specifying a scan line or a scan line group to be used for symbol recognition.

The fixed value may be set to a gain selected when a symbol is located within a short distance apart from the device.

A distant symbol is recognized according to only the output signal of the detector caused by a scan line or a scan line group, realizing an accurate symbol read. A near symbol is recognized according to the output signals of the detector by all of the scan lines, providing an excellent handling of the symbol read device when reading symbols.

BRIEF DESCRIPTION OF THE DRAWINGS

Various embodiments of the invention will be described in detail with reference to the figures. Like reference numerals designate like or corresponding parts.

DETAILED DESCRIPTION OF THE PREFERRED EMBODIMENTS

The following described embodiments constitute the best mode at the time this application was filed for practicing the invention.

Figure 1:
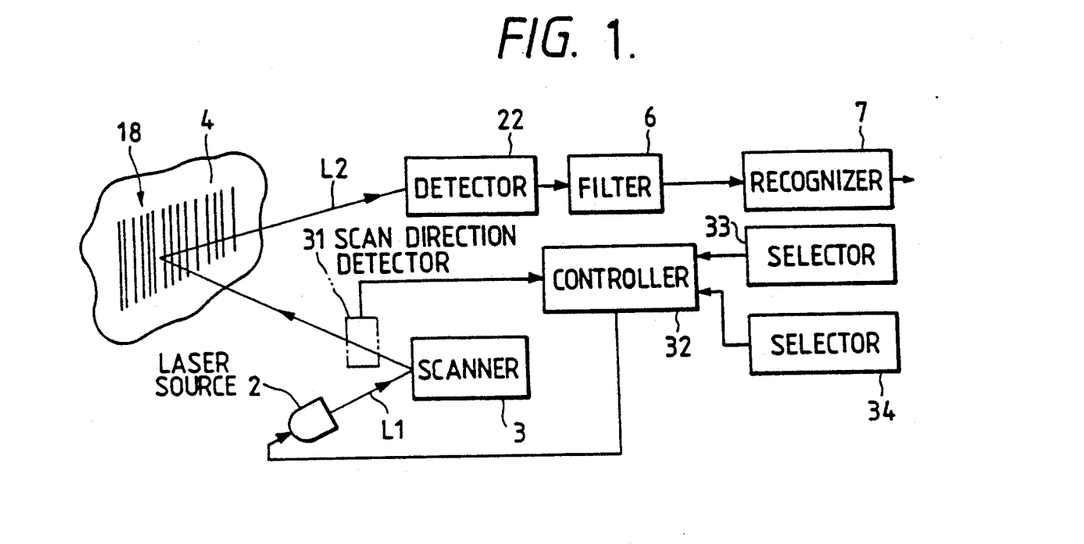
FIG. 1 is a block diagram of a bar code read device according to the present invention.
Figure 2:
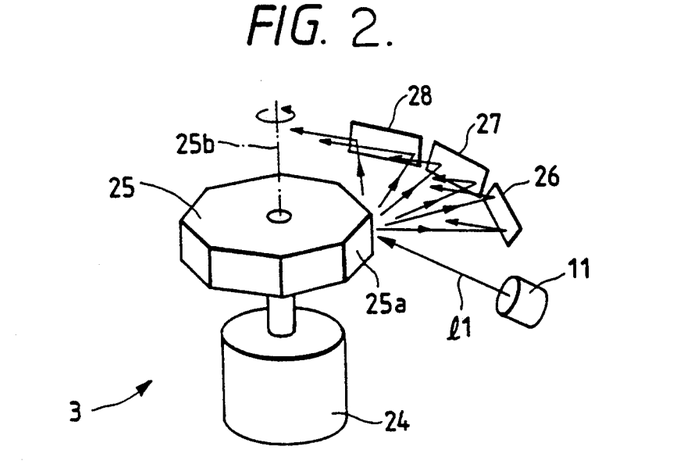
FIG. 2 is a perspective view of the scanner.

FIG. 1 is a block diagram of another arrangement of a symbol read device according to the present invention. In this embodiment there is no positional light source separate and distinct from light source 2. A laser beam L1 emitted by a laser source 2 passes through a scanner 3 which may include a polygon mirror, or the like. A beam from scanner 3 passes through an opening in casing 8 (not shown in this figure) and is directed toward a bar code 18. The laser beam L1 is scattered on a symbol surface 4. Reflected light L2 is received by a detector 22 which may include a photo diode, or the like. An output of detector 22 is coupled to a recognizing circuit 7 through a filter 6 having a pass band centered at a first frequency f1. The recognizing circuit 7 converts an output signal of the filter 6 into a binary (two-value) signal by which information representing the bar code 18 is reproduced.

Laser source 2 is pulse-driven by the first frequency f1 which is much higher than a spatial frequency of the bar code 18. Pulse driving laser source 2 reduces power consumption with respect to driving laser source 2 continuously. The component of the frequency f1 is extracted by the filter 6 so that the interference by a light disturbance is removed, and the bar code is accurately read.

A scan-direction detector 31 detects the three scan directions. Detector 31 is placed on an optical path from the scanner 3 to the symbol surface 4. A signal from detector 22 is processed and eventually used to control a beam emitting controller 32 for controlling the output operation of the beam emitter 11. Controller 32 pulse-drives the beam emitter 11 at the first frequency f1. That is, the controller 32 controls an average output power of the laser beam L1 emitted from the beam emitter 11 by a duty ratio of a turn-on/turn-off of the beam emitter 11.

The beam emitting controller 32 is coupled to an output of a selector 33 for selecting a multi-directional scan mode for all of the three scans or a unidirectional scan mode for only one of the three scans. Controller 32 is further coupled to receive an output from a selector 34 for selecting the scan direction in the unidirectional scan mode.

Figure 5:
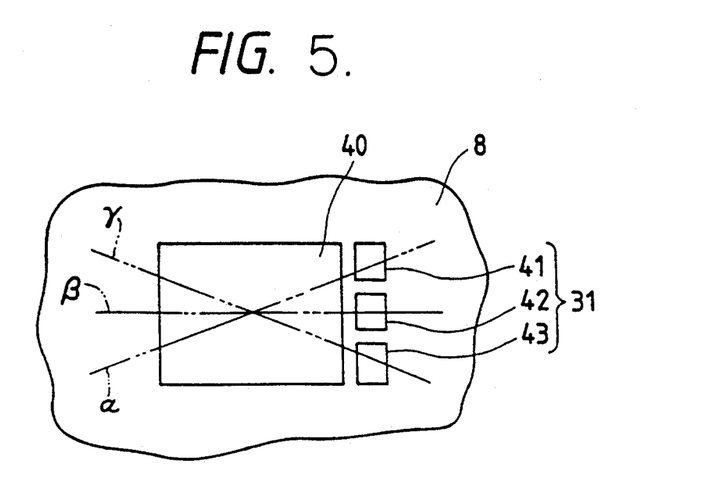
FIG. 5 is a view of the scan direction detector.

Scanner 3 is arranged as shown in FIG. 5. Plane mirrors 26, 27, and 28 are disposed around a polygon mirror 25. The various side face surfaces, such as surface 25a, of polygon mirror 25 are polarized reflecting surfaces that are slanted at predetermined angles with respect to an axial line 25b. Polygon mirror 25 is rotated at a fixed angular speed by a motor 24.

Figure 4:
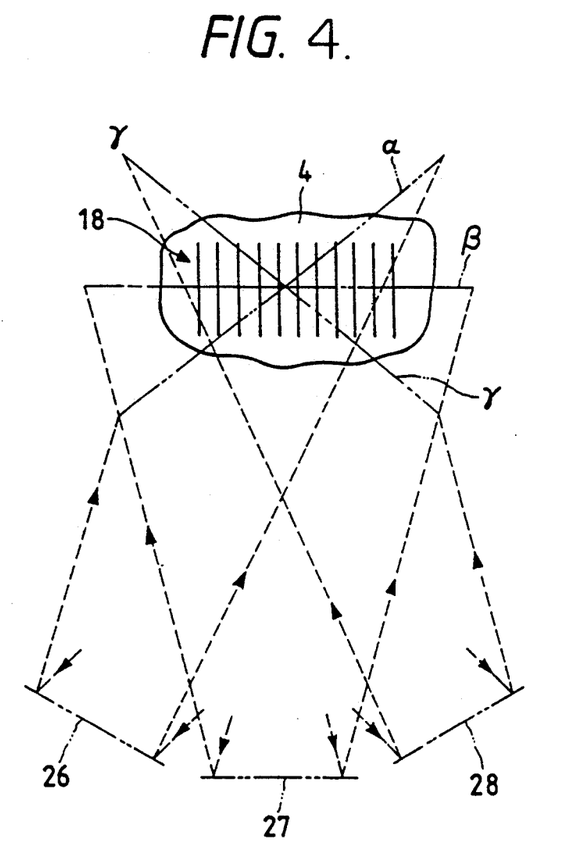
FIG. 4 is a view explaining how the scanner scans a symbol surface.

FIG. 4 is an explanatory diagram showing how the bar code 18 on symbol surface 4 is scanned by scanner 3. With the rotation of the polygon mirror 25, an incident angle of the laser beam on each reflecting surface 25a varies, so that the laser beam from the polygon mirror 25 is first incident on the plane mirror 26, then on plane mirror 27 and then on mirror 28. The laser beam reflected from the plane mirror 26 forms a scanning line $\alpha$ on symbol surface 4. When the polygon mirror 25 is further rotated, the laser beam from the mirror 25 is incident on the second plane mirror 26, which forms a scanning line $\beta$ on the symbol surface 4. Then, the laser beam from the mirror 25 is incident on the third plane mirror 28, and the laser beam reflected thereby forms a scanning line $\gamma$ (greek symbol tau) on the symbol surface 4. In this way, the laser beam forms the scanning lines $\alpha$, $\beta$, and $\gamma$ of different directions on the symbol surface 4.

If any of those scanning lines $\alpha$, $\beta$, and $\gamma$ moves across the entire bar code 18, the bar code 18 can be read using the output signal of detector 22. In the description to follow, the scans of the bar code 18 by the laser beam L1, which form the scanning lines $\alpha$, $\beta$, and $\gamma$, will be referred to "$\alpha$-direction scan", "$\beta$-direction scan", and "$\gamma$-direction scan", respectively.

FIG. 5 is a plan view showing in schematic form, scan-direction detector 31. An opening 40, through which the laser beam L1 passes outwardly, is formed in casing 8. Three photodetecting elements 41, 42, and 43, arrayed near the peripheral side of the opening 40, are fixed on the inner wall of the casing 8. The photodetecting elements 41, 42, and 43, corresponding to scanning lines $\alpha$, $\beta$, and $\gamma$, receive the laser beam L1 when the "$\alpha$-direction scan", $\beta$-direction scan , and "$\gamma$-direction scan" are terminated.

This particular embodiment is particularly useful in a scanning situation such as is used at a supermarket check out, where the orientation of bar codes to be read is indefinite. Selector 33 is operated to select the multi-directional scan mode. In this case, the symbol surface 4 is scanned with the laser beam L1 of which the average output power is equal for each one of the three "$\alpha$-direction scan", "$\beta$-direction scan", and "$\gamma$-direction scan". Accordingly, the bar code 18 can be recognized by using the output signal of detector 22 when any of the scanning lines scans across the entire bar code 18. There is no need for strictly setting up the positional relationship between the bar code 18 and the symbol read device. Data can efficiently be entered on the basis of reading the bar code. Where a plurality of bar codes are arrayed side by side, use of the multi-directional scan mode allows the symbol read device to mistakenly read a bar code which is not the bar code to be read by an operator (undesired bar code). In such a case, all the operator has to do is select one of the $\alpha$-scan direction, $\beta$-scan direction, and "$\gamma$-scan direction", to set up the unidirectional scan mode. In response to this, controller 32 increases the average output power (first value) of the beam emitter 11. For the scan of another direction, the average output power (second value) of the beam emitter 11 is decreased.

Figure 6:
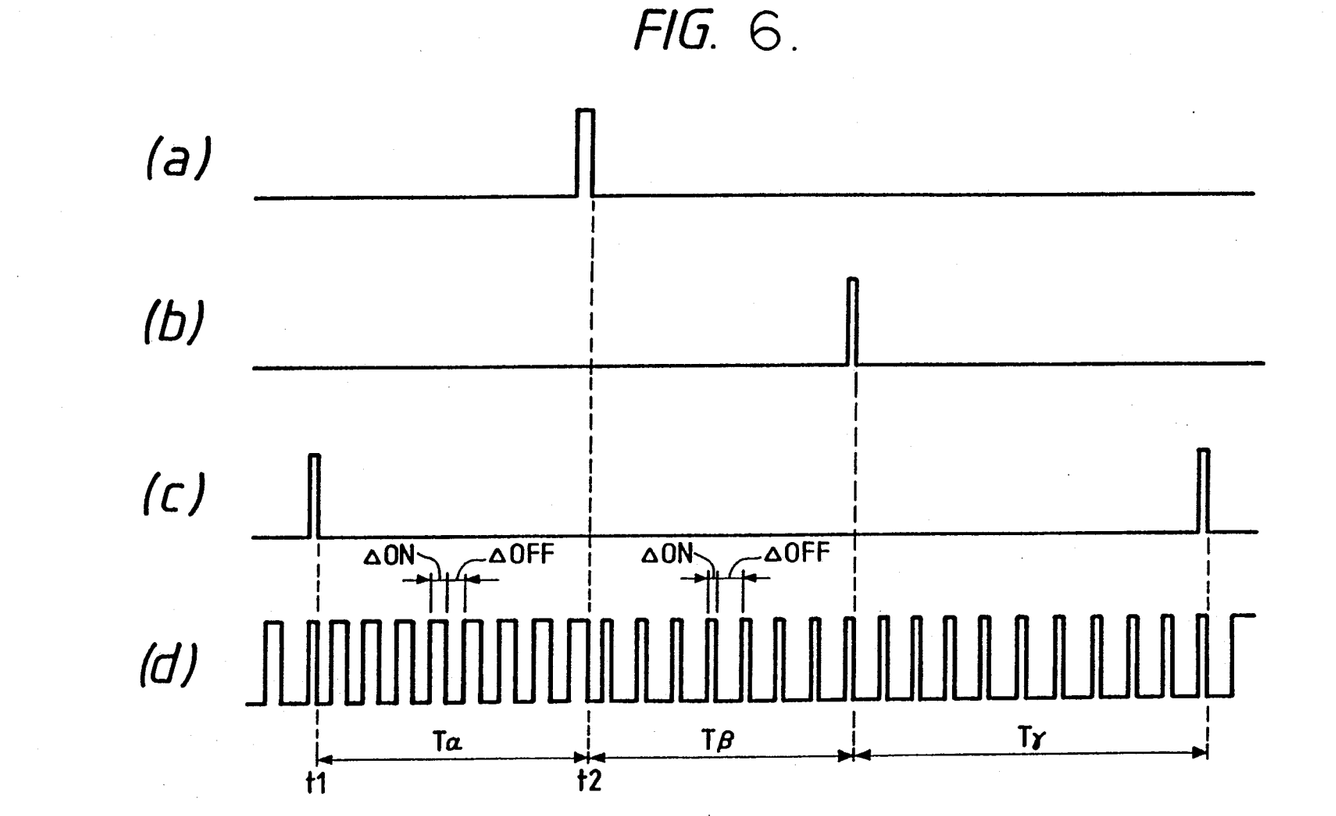
FIG. 6 is a timing chart showing an operation of the bar code reader when the unidirectional scan mode is executed upon selection of the $\alpha$-direction scan.

FIG. 6 is a timing chart showing an operation of the bar code reader when the unidirectional scan mode is executed upon selection of the $\alpha$-direction scan. FIGS. 6($a$) through 6($c$) show waveforms of the output signals of the photodetecting elements 41, 42 and 43 shown in FIG. 5. FIG. 6($d$) shows an operation of the beam emitter 11. The "$\alpha$-direction scan", "$\beta$-direction scan", and "$\gamma$-direction scan" are sequentially performed, so that the scan lines are formed in the order of ... $\alpha \rightarrow \beta \rightarrow \gamma$ ... The laser beam 11 emitted from the beam emitter 11 being pulse driven is detected by the photodetecting element 43, and the "$\gamma$-direction scan" terminates. Then, the beam emitting controller 32 increases a ratio of the turn-on time $\Delta$ ON to the turn-off time $\Delta$ OFF during a period T$\alpha$ from the termination of the $\gamma$-direction scan till the photodetecting element 41 detects the laser beam 11. As a result, the "$\alpha$-direction scan" during period T$\alpha$ is performed by the laser beam 11 of a large average output power. At time t2, the photodetecting element 41 detects the laser beam 11 and the "$\alpha$-direction scan" terminates. Then, the beam emitting controller 32 decreases a ratio of the turn-on time $\Delta$ON to the turn-off time $\Delta$OFF, so that the average output power of the laser beam 11 is decreased. In this way, the "$\beta$-direction scan" is performed by the laser beam 11 of a low average output power during a period T$\beta$ from the termination of the "$\gamma$-direction scan" till the photodetecting element 42 detects the laser beam 11. Also during a period T$\gamma$ from when the photodetecting element 42 detects the laser beam 11 until the photodetecting element 43 detects the laser beam 11, the "$\gamma$-direction scan" is performed by the laser beam 11 of a low average output power.

Thus, only the "$\alpha$-direction scan" is performed using the laser beam 11 of a large average output power. During the periods of the "$\beta$-direction scan" and the "$\gamma$-direction scan", the output signal of the detector 22 is too small to recognize the bar code. Therefore, the bar code is read only in the "$\alpha$-direction scan".

As described above, when using the bar code reader of the present embodiment, an operator may select either of the multi-directional scan mode to read the bar code by the three-direction scan or the unidirectional scan mode to read bar code by the one-direction scan. Where a plurality of bar codes are closely arrayed, the use of the multi-directional scan mode allows the bar code read device to mistakenly read a undesired bar code so that the data entry work becomes inefficient, the unidirectional scan mode is selected. Thus, the operator may select the unidirectional scan mode or the multi-directional scan mode according to the condition of using the bar code reader, leading to a remarkable improvement of the data entry work efficiency. The scan direction in the unidirectional scan mode may be selected by the selector 34. The reason for this is that the adaptability of the bar code reader for various use conditions is improved. When this feature is incorporated into a bar code reader fixed in a position above a belt conveyor, the bar code reader can read bar codes of different orientations, attached to articles conveyed by the conveyor. When the feature is incorporated into the hand-held type bar code readers, the scan direction may be selected according to the skillful hand of an operator or his/her own taste, leading to a further improvement of data entry work efficiency.

Also in the present embodiment, when the unidirectional scan mode is selected by the selector 33, the scan in the selected scan direction is performed by the large power laser beam, while the scans in the remaining scan directions, by the small power laser beam. Accordingly, if each output value is properly selected, the bar code may be read in the multi-directional scan mode when a distance between the bar code and the bar code reader is short, and it may be done in the unidirectional scan mode when the distance is long. If it is so done, the undesired bar code will not be read when the distance is long, and when the distance is short, the positional relationship between the bar code and the bar code reader need not be precisely set.

In the present embodiment, when the unidirectional scan mode is selected, the emission of the laser beam L1 may be stopped during the periods of the scans other than the "$\alpha$-direction scan". In this case, however, the arrangement of the scanner shown in FIG. 5 cannot detect the scan direction.

To cope with this, an alternative arrangement of scanner 3 is shown in FIG. 11. A permanent magnet 51 is fixed to a drive shaft 24$a$ of the motor 24 for rotating the polygon mirror 25. Thus, magnet 51 rotates with drive shaft 24$a$. A plurality of coils 52 are disposed close to a path along which the permanent magnet 51 rotates. An output signal of each of the coils 52 is applied to an angle detector 53 so that an angular position of mirror 25 can be detected. Thus, the device can recognize which of the plane mirrors 26, 27 or 28 reflects the laser beam L1 from the beam emitter 11. Accordingly, it can detect "$\alpha$-direction scan", "$\beta$-direction scan", or "$\gamma$-direction scan". In a symbol read device incorporating a scanner 3 as shown in FIG. 11, the output signal of the detector 53 is applied to controller 32 (shown in FIG. 4), to stop the emission of the laser beam 11 from the beam emitter 11 in the "$\beta$-direction scan" and the "$\gamma$-direction scan".

In the embodiment as mentioned above, when the bar code reader is in the unidirectional scan mode, the average output power of the laser beam L1 is reduced (or stopped) during the scanning operation of a non-select scan direction. The frequency of the pulse signal for turning on the beam emitter is switched to the second frequency different from the first frequency; the average output power of the laser beam L1 is not reduced.

Let us consider a case where the "$\alpha$-direction scan" is selected by the selector 33 and the unidirectional scan mode is selected by the selector 33. When the "$\alpha$-direction scan" is performed according to the output signal of the scan direction detector 31, the beam emitting controller 32 sets the pulse turn-on frequency of the beam emitter 11 at the first frequency as the passing frequency of the filter 23. During the periods of the "$\beta$-direction scan" and the "$\gamma$-direction scan", the beam emitter 11 is turned on by the second frequency as the frequency out of the passing frequency band.

As a result, the output signal of the detector 22, which is produced in other scans than the "α-direction scan", is removed by the filter 23. Accordingly, recognizing circuit 7 recognizes the bar code depending only on the "α-direction scan". In this way, the unidirectional scan is substantially realized.

Figure 3:
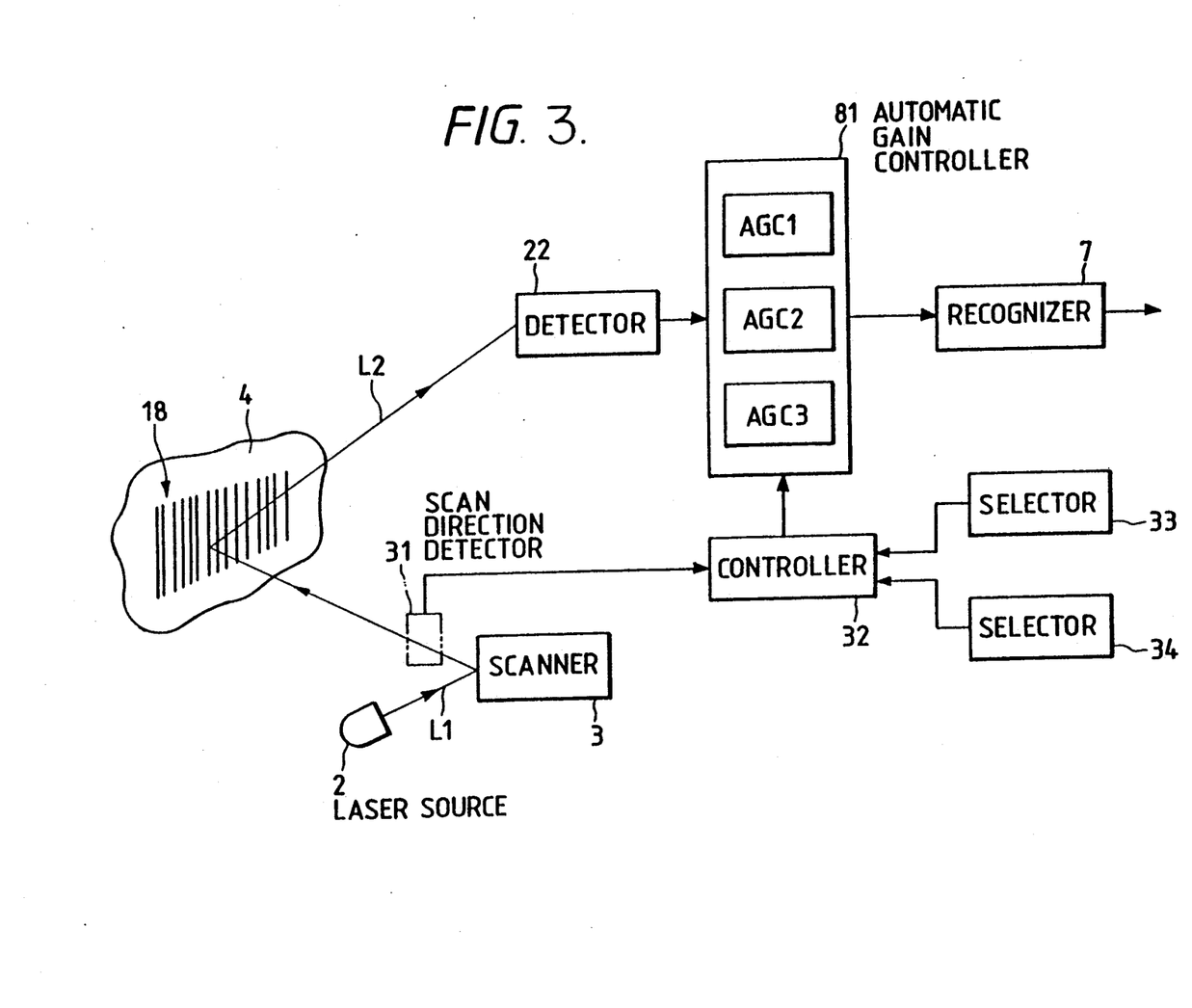
FIG. 3 is a block diagram of a bar code read device according to the present invention.

FIG. 3 is a block diagram of another embodiment of a symbol read device according to the present invention. This arrangement is similar to that shown in FIG. 4, except that the output signal of detector 22 is applied to an automatic gain controller 81 having a plurality of automatic gain control circuits AGC1 to AGC3.

Automatic gain control circuits AGC1 to AGC3 respectively correspond to the "α-direction scan", "β-direction scan" and "γ-direction scan". According to the output of detector 31, controller 32 selects the automatic gain control circuit AGC1 during a period in which the laser beam L1 forms the scan line α shown in FIG. 7, It selects the automatic gain control circuit AGC2 during a period that the laser beam L1 forms the scan line β. It selects the automatic gain control circuit AGC3 during a period that the laser beam L1 forms the scan line γ. The automatic gain control circuits AGC1, AGC2, and AGC3 are sequentially selected as the scan by the laser beam 11 progresses.

Figure 7:
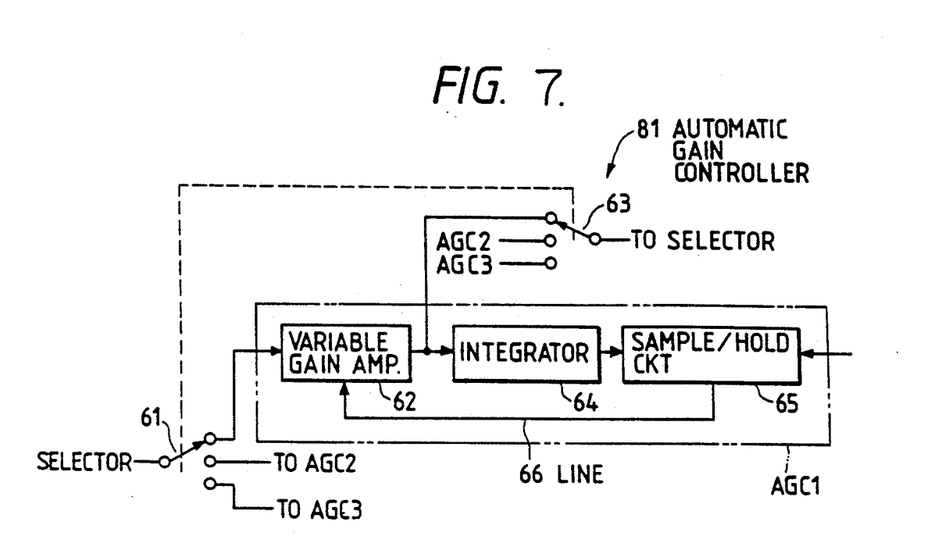
FIG. 7 is a block diagram showing an automatic gain control circuit group 23.
Figure 8:
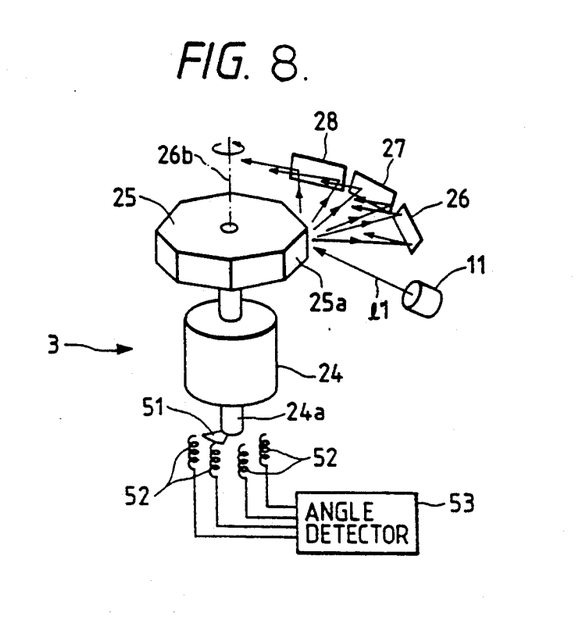
FIG. 8 is a schematic diagram showing an alternative embodiment of a scan direction detector.

FIG. 7 is a block diagram of automatic gain controller 81. Only automatic gain control circuit AGC1 is shown because the others are similarly arranged.

An output signal of detector 22 is applied to any of the automatic gain control circuits AGC1 to AGC3, through a selector 61 which is operated, by the controller 32, according to the detect result from the scan direction detector 31. The output of detector 22 is applied to a selector 63 which is interlocked with the selector 61. During the period of the "α-direction scan", selectors 61 and 63 are both connected to the automatic gain control circuit AGC1. During the period of the "β-direction scan", the select circuits are both connected to the automatic gain control circuit AGC2. During the period of the "γ-direction scan", those circuits are both connected to the automatic gain control circuit AGC3.

The output signal of a variable gain amplifier 62 is applied to an integrator 64. The integrator 64 is used for calculating an average value of the output signal of the variable gain amplifier 62 during the period of one scan. The output signal of integrator 64 is applied to a sample/hold circuit 65. The sample/hold circuit 65 samples and holds the output signal of the integrator 64 at the termination of the "α-direction scan" in response to a sampling clock signal derived from the controller 32. The voltage that is held is applied as a control voltage to the variable gain amplifier 62, through a signal line 66, and determines a gain of the amplifier.

For the details of the variable gain amplifier 62, the integrator 64, and the sample/hold circuit 65, reference is made to Japanese Patent Application Unexamined Publication No. 63-93950, which is incorporated herein by reference.

During the period of the "α-direction scan", the output of detector 22 is amplified at a gain set by the automatic gain control circuit AGC1. During the period of the "β-direction scan", the output signal of the detector 22 is amplified at a gain set by the automatic gain control circuit AGC2. During the period of the "γ-direction scan", the output signal of the detector 22 is amplified at a gain set by the automatic gain control circuit AGC3. Thus, the gain for the output signal of the detector 22 in the scan of one direction is not influenced by that for the output signal in the scan of other directions. A gain of the automatic gain control circuit AGC1 in the present "α-direction scan" is determined depending on the output signal level of the detector 22 in the previous "α-direction scan", and hence it is not influenced by the output signals of the detector 22 in the β-direction scan" and the "γ-direction scan". The same thing is true for the "β-direction scan" and the "γ-direction scan". Even if the regular reflection light from the symbol surface or an object of high reflectivity, for example, metal, in the "β-direction scan" or "γ-direction scan" is incident on the detector 22, a gain set by the automatic gain control circuit AGC1 corresponding to the "α-direction scan" will not be extremely small. As a result, the bar code read device can recognize the bar code 18 read through "α-direction scan", free from the influence by the regular reflection light, and the like.

As described above, the bar code read device can minimize the impairment of the read performance due to the regular reflection light, though it uses the automatic gain control circuits. In addition to this, the device can accurately read symbols in various conditions.

The operation of the selector 33 shown in FIG. 3 will now be described. In the supermarket check out situation, described above, the read mode by the multi-directional scan is selected so as to provide an easy handling of the bar code read device when it reads a bar code. Where a plurality of bar codes are arrayed side by side, if the symbol recognition is performed through all of the α-, β-, and γ-direction scans, the bar code read device may mistakenly read a bar code, which is not the bar code to be read.

In such a case, an operator selects the "α-direction scan", β-direction scan. or "γ-direction scan" by means of the selector 34, and sets up the unidirectional scan mode by means of the selector 34. In response to this, the controller 32 permits only the automatic gain control circuit corresponding to the selected scan direction in the automatic gain controller 81 to operate, which prohibits the remaining automatic gain control circuits from operating (that is, forcibly sets the gain to "0"). More specifically, the selector circuits having terminals not connected to any of the automatic gain control circuits AGC1 to AGC3 are used for the select circuits 61 and 63. Under control of the controller 32, the control circuits are set up in either of two states, one in which they are connected to the automatic gain control circuit corresponding to the scan direction selected by selector 34, and the other in which they are not connected to any of the automatic gain control circuits.

When the "α-direction scan", for example, is selected by selector 34, only the automatic gain control circuit AGC1 is allowed to operate, while the remaining circuits AGC2 and AGC3 are prohibited from operating. The controller 32 connects the select circuits 61 and 63 to the automatic gain control circuit AGC1 only when the "α-direction scan" is performed. Accordingly, the automatic gain control circuit AGC1 controls the variable gain amplifier 62 so as to amplify the output signal of detector 22 in the present "α-direction scan" at the gain set by a control signal that is held by the sample/hold circuit 65 in association with the output signal of detector 22 in the previous "α-direction scan".

For the "β-direction scan" and the "γ-direction scan", the gain for the output signal of the detector 22 is zero (0). Accordingly, the bar code read device recognizes the symbol surface 4 depending only on the "α-direction scan". When a plurality of bar codes are closely arrayed and use of the multi-directional scan mode leads to a mistaken read of an undesired bar code and hence to make the data entry work inefficient, an operator can cope with the problem by selecting the unidirectional scan mode. Thus, when using the bar code read device of the present embodiment, the operator may select the unidirectional scan mode or the multi-directional scan mode according to the use conditions of the bar code read device, remarkably improving the data entry work through the bar code read.

The scan direction in the unidirectional scan mode may be selected by selector 34 to enhance the adaptability of the symbol read device for use under various conditions. When this feature is incorporated into a bar code reader fixed at a position above a belt conveyor, the bar code reader can read bar codes of different orientations, attached to articles conveyed by the conveyor. When the feature is incorporated into the hand-held type bar code readers, the scan direction may be selected according to the skillful hand of an operator or his own taste, leading to a further improvement of data entry work efficiency.

The present embodiment may be modified such that when the unidirectional scan mode is designated by the selector 33, the gain corresponding to the scan direction not selected by the selector 34 is not set to 0, but is set to a fixed value given when the symbol surface 4 is located close to the device. Specifically, when the "α-direction scan" is selected by the selector 34, a fixed voltage is used as a control signal to determine gains of the automatic gain control circuits AGC2 and AGC3 corresponding to the "β-direction scan" and the "γ-direction scan".

The bar code read device thus arranged may be operated in the following manner. When the distance between the bar code and the symbol surface is short, the multi-directional scan mode is selected and the bar code recognition processing is performed using the data gathered through the scan. When the distance is long, the unidirectional scan mode is selected and the bar code recognition processing is performed using the data gathered through the scan. Therefore, the problem that when reading a distant bar code, the bar code read device may mistakenly read an undesired bar code can be solved. Additionally, roughly setting of a positional relationship between the bar code and the device suffices when reading near bar codes, suffices for securing efficient data entry work.

Figure 9:
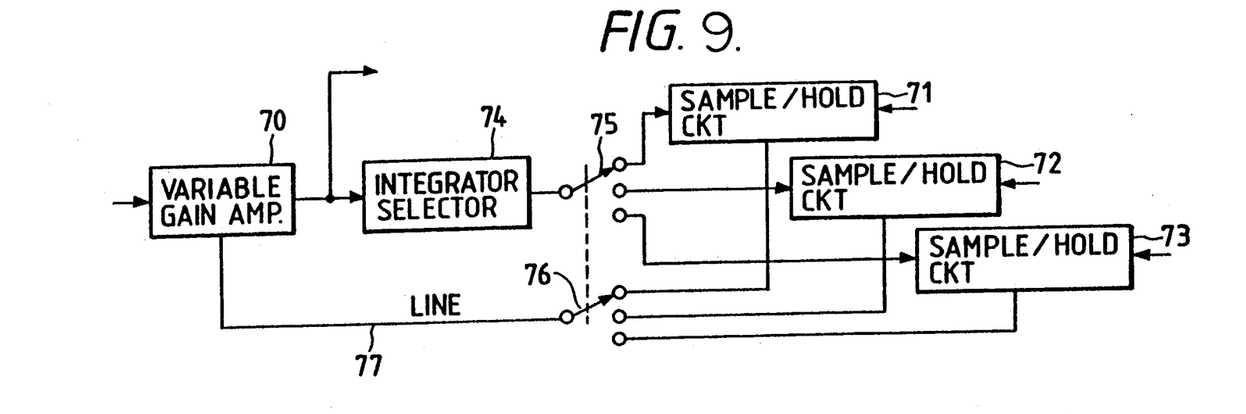
FIG. 9 is a block diagram showing an alternative embodiment of an automatic gain control circuit.

FIG. 9 is a block diagram of an alternative embodiment of automatic gain controller 81. As shown, a single variable gain amplifier 70 is provided for the three scan directions, "α-direction scan", "β-direction scan", and "γ-direction scan". Three sample/hold circuits 71, 72 and 73 are provided for the three scans, respectively. In operation, a signal amplified by the variable gain amplifier 70 is applied to an integrator 74 which in turn integrates the signal over a period corresponding to the scan by the laser beam L1. The integrated signal, after each scan terminates, is applied through a selector 75 to the corresponding sample/hold circuit 71, 72 or 73 where it is sampled and held. Each of the sample/hold circuits 71 to 73 receives a sampling signal from the controller 32 according to the output signal of the scan direction detector 31.

One of the output signals of the sample/hold circuits 71 to 73 is selected by the selector 76, and is applied, as a control signal to determine a gain of the variable gain amplifier 70, through a line 77 to the amplifier 70. Selectors 75 and 76, interlocked with each other, are operated by a control signal from the controller circuit 71. During the period of the "β-direction scan", those circuits are connected to the sample/hold circuit 71. During the period of the "β-direction scan", those circuits are connected to the sample/hold circuit 72. During the period of the "γ-direction scan", those circuits are connected to the sample/hold circuit 73.

It is evident that the arrangement as described above can achieve substantially the same operation and effects as those of the previous embodiment. When comparing with the arrangement of automatic gain controller shown in FIG. 10, the required numbers of the variable gain amplifiers and the integrator are small in the present embodiment, and hence its construction is more simplified.

Another embodiment of the invention will now be described. In the embodiments as mentioned above, three scan modes are used and the automatic gain control circuits are provided for those scan modes, respectively. As shown in FIG. 10, eight scan lines S1 to S8 of eight different directions may be formed by the laser beam L1. In this case, the positions scanned by the scan lines closely located are little different from each other. Therefore, use of equal gains for the output signals of the detector for two to three scan lines closely located, becomes little problematic in practical use.

In the present embodiment, the scan lines S1 to S8 are gathered into three groups, S1 to S3, S4 to S6, and S7 and S8. The automatic gain control circuit shown in FIG. 7 is provided for each group (in the arrangement of FIG. 9, the sample/hold circuit is provided for each group).

In the arrangement of the present embodiment, the number of the automatic gain control circuits (or the sample/hold circuits) may be smaller than that of the scan lines. Therefore, when the present embodiment is applied for the case where a number of scan lines are used, the effects comparable with those of the first and second embodiments may be achieved by a lower cost.

Various embodiments have been presented in an effort to fully explain the invention. It should be understood, however, that the invention is not limited to the specific embodiments described in detail above. Rather, the principles of the present invention could be applied to other embodiments as well.

In describing embodiments using the omni-scan mode, it should be recognized that the raster-scan mode could alternatively be used. Thus, the FIG. 10 and FIG. 11 type scans can be used in the alternative in any of the multiple scan arrangements.

In the case of raster scan mode, the automatic gain control circuits may be provided for the scan lines s1 to s5, respectively. Alternatively, scan lines s1 to s5 may be gathered into groups. An automatic gain control circuit is provided for each group of scan lines. The circuit shown in FIG. 9 may used for this type of the bar code read device.

The various embodiments including a discussion of omni scan are illustrated using three scan lines only. Of course the invention is not limited to the use of three such scan lines. The three line example makes it easy to illustrate and understand the invention. However, two or more lines could be effectively utilized. The selectors could be configured according to the number of different scan lines utilized.

The description of the preferred embodiments has been made in terms of a device intended to read bar codes. However, the principles of the invention are equally applicable to optical character reader (OCR) devices. Such devices scan symbols with a light beam in order to read symbols. It should be understood that the invention may be variously changed, altered and modified within the scope of the invention.

In the foregoing descriptions, it was indicated that the gain of the variable gain amplifier for amplifying the output signal of the detector is set for each scan line or scan line group. The gain of the amplifier can be adjusted as necessary and can be independent of the gain likewise set for another scan line or scan line group.

In an situation where the detector receives the regular reflection light from the symbol surface during a scan or in a situation where a scan line group moves across an object of a high reflectivity, such as metal, and light of high intensity is incident on the detector, if the gain for the scan line or the scan line group becomes extremely small, such an extremely small gain will not be set for another scan line or scan line group. Therefore, the symbol read device can accurately read symbols using the output signal of the detector for the latter scan line or scan line group. Thus, the symbol read device of the invention, because of use of the automatic gain controller, can accurately read symbols in a wide read range and in various read conditions.

The symbol read device according to the present invention may include one or more selector positions for controlling the gains of the various scan lines as desired. They could be set individually, in groups, etc. For example one scan line could have a gain that is automatically controlled and the others could be fixed. This feature is very useful in a situation wherein many symbols are closely arrayed and an undesired symbol may be mistakenly read. A mistaken read can be avoided by specifying a scan line or a scan line group to be used for symbol recognition.

If the fixed value is set to a gain selected when a symbol is located within a short distance apart from the device, a distant symbol is recognized according to only the output signal of the detector caused by a scan line or a scan line group, realizing an accurate symbol read. A near symbol is recognized according to the output signals of the detector by all of the scan lines, providing an excellent handling of the symbol read device when reading symbols.

When the symbol surface is placed at the symbol-read-impossible position, the beam emitter and the scanner are not driven and a symbol read operation is not performed. When the symbol surface is at the symbol-read-possible position, the beam emitter and the scanner are automatically controlled under control of the controller, so that the symbol read operation is performed.

Accordingly, when a great number of symbols are read for data entry, the symbol read device can efficiently proceed with the data entry work, because the switching operation to instruct the start of the symbol read operation is not required in the image read device. When the symbol surface is placed greatly apart from the read device such a distance as to provide an unreliable read operation or the symbol surface is out of the read field of the read device, the beam emitter and the scanner are not driven, and the laser beam will not enter the eyes of the persons near the device, improving the safety of the device. Further, the device will not mistakenly read the symbol greatly apart from the read device.

Furthermore, in the bar code read device, unlike the conventional one, it is not necessary to set the direction of the laser beam emission at a fixed target position when the device detects the symbol surface. For this reason, there is no need of a controller to control the scanner to change the beam emitting direction, leading to a simplified construction of the bar code read device.

What is claimed is:

1. A symbol read device comprising:
   means for emitting a light beam;
   means for scanning the light beam over different positions on a symbol surface bearing a symbol to be read;
   detecting means for detecting light reflected from the symbol surface and generating a detection signal indicative thereof;
   a variable gain amplifier means for amplifying the detection signal;
   recognizing means signal processing an amplified detection signal from the amplifier and recognizing therefrom the symbol bearing read;
   automatic gain control (AGC) means for setting a gain of the variable gain amplifier means every scan line or scan line group including a preset number of scan lines, in response to the detection signal;
   scan position detecting means for detecting a scan position; and
   control means for selecting the gain set by the AGC means, based on an output signal of the scan position detecting means.

2. A symbol read device according to claim 1, wherein the AGC means comprises:
   a gain control circuit corresponding to each scan direction, an output of the gain control circuit controlling wherein the gain of a variable gain amplifier is determined by its output signal.

3. A symbol read device according to claim 2 further comprising:
   a select means for controlling an operational mode of the AGC means including means for controlling the gain of a gain control circuit corresponding to a detection signal related to a specific scan line.

4. A symbol read device according to claim 1, wherein:
   the AGC means comprises a single variable gain amplifier for all the scan directions such that variable gain amplifier output information is stored in memory interlocked with each scan direction to control the output signal of the variable gain amplifier.

* * * * *